US007958369B2

(12) United States Patent
Apostolopoulos

(10) Patent No.: US 7,958,369 B2
(45) Date of Patent: Jun. 7, 2011

(54) SYSTEMS AND METHODS FOR MULTIPLE LEVEL CONTROL OF ACCESS OF PRIVILEGES TO PROTECTED MEDIA CONTENT

(75) Inventor: John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1400 days.

(21) Appl. No.: 10/970,912

(22) Filed: Oct. 22, 2004

(65) Prior Publication Data
US 2006/0090082 A1    Apr. 27, 2006

(51) Int. Cl.
G06F 11/30        (2006.01)
G06F 12/14        (2006.01)
(52) U.S. Cl. ........................................ 713/189; 380/287
(58) Field of Classification Search .................. 713/189; 380/287, 211
See application file for complete search history.

(56) References Cited

U.S. PATENT DOCUMENTS

| 5,870,474 | A  | * | 2/1999  | Wasilewski et al. ........ 380/211 |
| 6,240,185 | B1 | * | 5/2001  | Van Wie et al. ............. 380/232 |
| 6,449,367 | B2 | * | 9/2002  | Van Wie et al. ............. 380/232 |
| 6,978,376 | B2 | * | 12/2005 | Giroux et al. ............... 713/189 |
| 6,983,371 | B1 | * | 1/2006  | Hurtado et al. ............. 713/189 |
| 7,159,116 | B2 | * | 1/2007  | Moskowitz ................... 713/176 |
| 2003/0088784 | A1 | * | 5/2003 | Ginter et al. .................. 713/189 |
| 2003/0106063 | A1 | * | 6/2003 | Guedalia ........................ 725/90 |
| 2003/0188173 | A1 | * | 10/2003 | Zimmer et al. .............. 713/189 |
| 2003/0200448 | A1 | * | 10/2003 | Foster et al. ................. 713/189 |
| 2003/0236987 | A1 | * | 12/2003 | Griffin et al. ................ 713/189 |
| 2004/0083375 | A1 | * | 4/2004 | Foster et al. ................. 713/189 |
| 2004/0193897 | A1 | * | 9/2004 | Van Volkenburgh ......... 713/189 |
| 2004/0196972 | A1 |   | 10/2004 | Zhu et al. |
| 2005/0144465 | A1 | * | 6/2005 | Senshu ......................... 713/189 |
| 2005/0177740 | A1 | * | 8/2005 | Athaide et al. ............... 713/189 |
| 2005/0216752 | A1 | * | 9/2005 | Hofmeyr et al. ............. 713/189 |

FOREIGN PATENT DOCUMENTS

| EP | 1189432      | 3/2002 |
| JP | 2002-123428  | 4/2002 |
| WO | WO 02/01271  | 1/2002 |

OTHER PUBLICATIONS

Shengli Wu, Authorization and Access Control of Application Data in Workflow Systems, Jan. 1, 2001, Springer Netherlands, vol. 18, 71-94.*

IBM Technical Disclosure Bulletin—"Multimedia Mixed Object Envelopes Supporting a Graduated Fee Scheme Via Encryption"—Mar. 1, 1994 pp. 413-417.

English translation of Korean Notice of Preliminary Rejection dated Sep. 30, 2008~ Korean Patent-Application No. 2007-7009062~pp. 1-4.

* cited by examiner

*Primary Examiner* — Joseph Thomas
*Assistant Examiner* — Monjour Rahim

(57) ABSTRACT

Systems and methods for multiple level control of access privileges to protected media content are disclosed. In one embodiment, first data is associated with media content. Different versions of the media content are produced using the first data. Each of the different versions include one or more portions of the media content. The one or more portions are selected using the first data. Second data is associated with the different versions. The second data identifies respective protection attributes used to encrypt the different versions. The respective protection attributes correspond to respective keys that provide respective levels of access to the media content.

41 Claims, 8 Drawing Sheets

300

| i | Scalable Profile (SPi) 303 | (PPi) | |
|---|---|---|---|
| | | Encryption 305A | Key Length 305B |
| 1 | Low Resolution(256x256) | None | 0 |
| 2 | Med-Resolution(512x512) | AES | 128 bit |
| 3 | High Resolution(2Kx2K) | AES | 256 bit |
| 4 | Highest Resolution(10Kx10K) | Proprietary | 256 bit |

FIG. 3

SYSTEMS AND METHODS FOR MULTIPLE LEVEL CONTROL OF ACCESS OF PRIVILEGES TO PROTECTED MEDIA CONTENT

TECHNICAL FIELD

Embodiments of the present invention relate to multiple level control of access privileges to protected media content.

BACKGROUND ART

Data delivery systems present many challenges for the system designer. For instance, clients can have different display, power, communication, and computational capabilities and/or different access privileges to delivered content. In addition, communication links in the system can have different maximum bandwidths, quality levels, and time-varying characteristics. A successful data delivery system should be able to deliver data streams to a multitude of diverse clients over heterogeneous networks with time-varying characteristics.

Providing proper security in order to protect content from eavesdroppers is another important consideration in the design of data delivery systems. Generally, to provide security, data are transported in encrypted form.

Stream adaptation, or transcoding, can be performed to scale data streams for different downstream client capabilities and/or access privileges and network conditions. A transcoder takes a compressed, or encoded, data stream as an input, and then processes it to produce another encoded data stream as an output. Examples of transcoding operations include bit rate reduction, rate shaping, spatial downsampling, and frame rate reduction. Transcoding can improve system scalability and efficiency, for example, by adapting the spatial resolution of an image to a particular client's display capabilities or by dynamically adjusting the bit rate of a data stream to match a network channel's time-varying characteristics.

Information about local and downstream network conditions and client capabilities/privileges can be collected and updated and content scaled according to that information. This can be more efficient than scaling the data at the source, because it is more difficult for the source to collect up-to-date and detailed information about conditions inside the network, especially at locations in the network relatively far removed from the source. Also, the source provides only one control point at the beginning of the delivery path, while intermediate transcoding nodes provide many additional control points at more strategic locations along the delivery path.

While network transcoding facilitates scalability in data delivery systems, it also presents a number of challenges. The process of transcoding can place a substantial computational load on transcoding nodes. While computationally efficient transcoding algorithms have been developed, they may not be well-suited for processing hundreds or thousands of streams at intermediate network nodes.

Furthermore, transcoding poses a threat to the security of the delivery system because conventional transcoding operations generally require that an encrypted stream be decrypted before transcoding. The transcoded result is re-encrypted but is decrypted at the next transcoder. Each transcoder thus presents a possible breach in the security of the system. This is not an acceptable situation when end-to-end security is required.

Compression, or encoding, techniques are used to reduce the redundant information in data, thereby facilitating the storage and distribution of the data by, in effect, reducing the quantity of data. The JPEG (Joint Photographic Experts Group) standard describes one popular, contemporary scheme for encoding image data. While JPEG is satisfactory in many respects, it has its limitations when it comes to current needs. A newer standard, the JPEG2000 standard, is being developed to meet those needs. However, even with the JPEG2000 standard, decryption of encrypted data is needed for transcoding, and transcoding processes remain computationally intensive. Furthermore, the introduction of a new standard such as JPEG2000 means that each of the large number of network nodes, as well as client devices, needs to be updated in order to be made compliant with the JPEG2000 standard.

Accordingly, a method and system that can allow the secure transmission of data to a variety of end users who have different capabilities and/or access privileges in a secure and computationally efficient manner would be advantageous. The present invention provides these as well as other advantages.

DISCLOSURE OF THE INVENTION

Systems and methods for multiple level control of access privileges to protected media content are disclosed. In one embodiment, first data is associated with media content. Different versions of the media content are produced using the first data. Each of the different versions include one or more portions of the media content. The one or more portions are selected using the first data. Second data is associated with the different versions. The second data identifies respective protection attributes used to encrypt the different versions. The respective protection attributes correspond to respective keys that provide respective levels of access to the media content.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 shows a table that illustrates an exemplary multiple level access control scheme according to one embodiment of the present invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

EXEMPLARY NETWORK CONTEXT FOR SYSTEM FOR MULTIPLE LEVEL CONTROL OF ACCESS PRIVILEGES TO PROTECTED MEDIA ACCORDING TO ONE EMBODIMENT OF THE PRESENT INVENTION

In the following discussion, embodiments of the present invention will be explicitly described in which a system for multiple level control of access privileges to protected media is provided. In one embodiment, access privileges to respective versions of the protected media content are controlled through the association of profile data (scalable and protection) with the protected media content. The profile data determines the version(s) of the protected media content that is accessible by respective end users. End users are given a decryption key that corresponds to the level of access to the protected media content that they have been granted. An end user can use the decryption key to access the version(s) of the protected media content to which they have been granted access.

Figure 1:
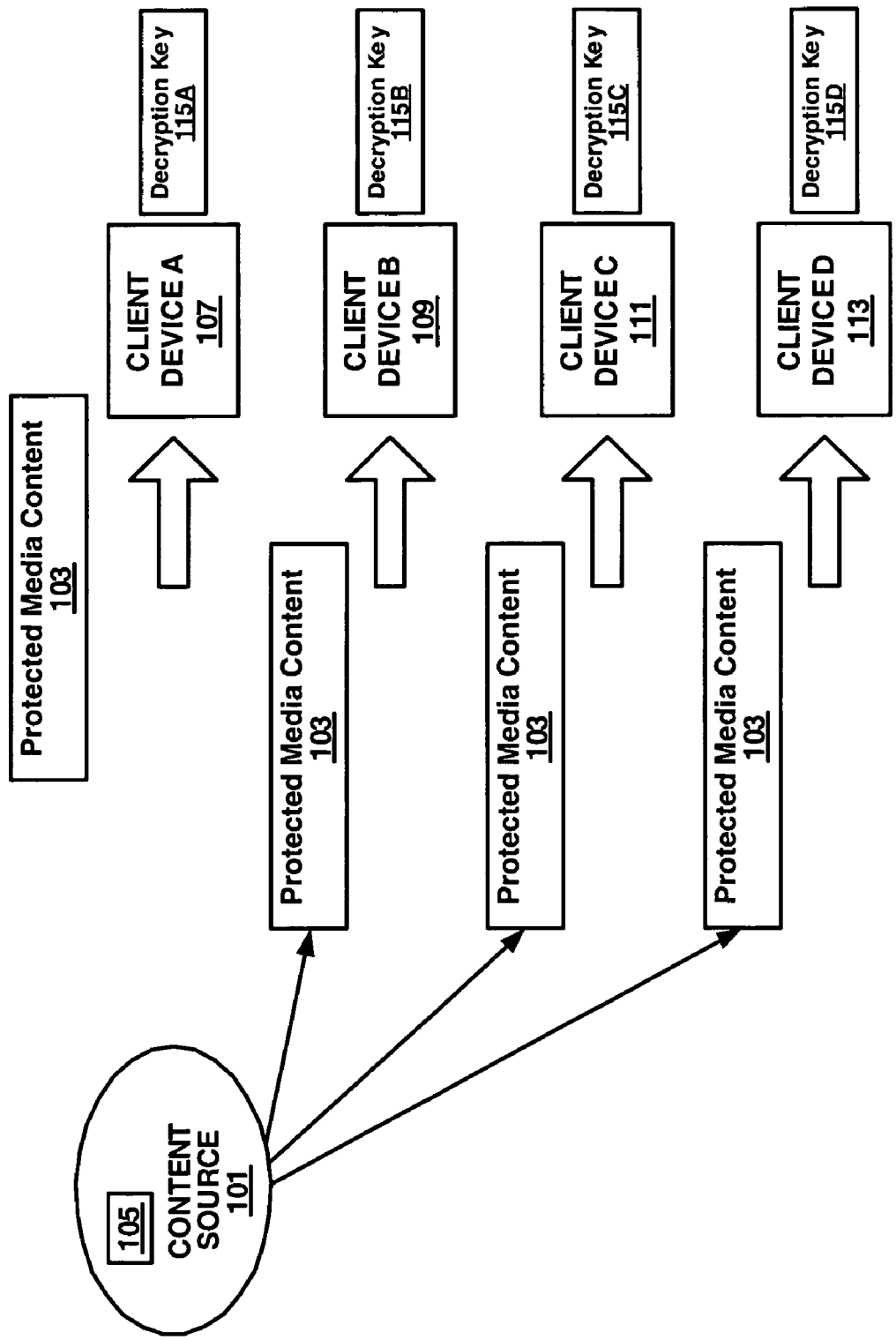
FIG. 1 shows an exemplary network context in which a system for multiple level control of access privileges to protected media content can be employed according to one embodiment of the present invention.

FIG. 1 shows an exemplary network context in which a system for multiple level control of access privileges to protected media content can be employed according to one embodiment of the present invention. FIG. 1 shows content source 101, protected media content 103, system for multiple level control of access privileges to protected media content 105, access controlled client device A 107, client device B 109, client device C 111 and client device D 113 and access keys 115A, 115B, 115C and 115D.

The access control (to protected media content 103) that is provided is based upon an adaptation of a protection profile (e.g., the details of the mechanism used to protect media content 103) of the protected media content 103 to provide different end users (e.g., those who seek to access protected media content from client devices A 107, B 109, C 111 and D 113) with different access control privileges. For example, in one embodiment, different protection mechanisms are employed to protect different versions of the protected media content so that different end users are only able to access the versions of the protected media content that corresponds to a level of access (and the access key e.g., 115) that the end user has been granted.

In the present embodiment, the protected media content 103 that is provided to respective end users can involve the same or different media objects. For example, different content can be made accessible to end users that have respective access privileges. In the present embodiment, the protection mechanisms can include different forms of encryption and encryption modes, different decryption keys and different key lengths, cryptographic checksums (CCSs) or message authentication codes (MACs), integrity checks, digital signatures, etc. Typically, multiple protection methods are used simultaneously, e.g. encryption and message authentication codes, with different keys for each. However to simplify the discussion, we limit the discussion to different forms of encryption.

The versions of the protected media content 103 that are available to be accessed by end users are determined by scalable profile data that is associated with the protected media content 103. For example, in a case where the scalable attribute "resolution" is involved, scalable profile data associated with the protected media content can dictate that the protected media content 103 be scalable to full, one half or one third, etc., resolution versions of the protected media content 103. In addition, protection profile data associated with the protected media content identifies the unique protection mechanism (e.g., form of encryption, key length) used to protect each version of the protected media content 103.

In one embodiment, content source 101 is configured to supply protected media content 103 (e.g., such as images) that has associated scalable and protection profile data to downstream network nodes that can include untrusted device(s) (e.g., such as transcoders) (not shown) and access controlled client devices (e.g., client device A 107, client device B 109, client device C 111 and client device D 113). Scalable profile data and protection profile data that are associated with the protected media content 103 determine the versions of the protected media content 103 that are accessible by various end users, and thus provide a means of controlling access to the various versions of the protected media content 103 that are supplied.

In one embodiment, only specified versions of the protected media content 103 are accessible at the client devices (e.g., A 107, B 109, C 111 and D 113). In another embodiment, all versions of the protected media content 103 are accessible at each client device.

In one embodiment, the end-user has access to the protected media content using his key, however he is unaware of the different forms of the content that may be available (and require different keys to gain access to). That is, the key provides the end-user access without the user knowing what level of access they have or whether other levels of access exist. For example, this is accomplished because the content is encrypted, and only a portion of it is decrypted using the available key.

In one embodiment, as alluded to above, one or more levels of access that determines an end user's capacity to access one or more versions of the protected media content 103 from amongst a set of multiple versions of the protected media content 103 can be granted to the respective end users. Access to the version(s) of the protected media content 103 that corresponds to the level of access possessed by end users is facilitated by access keys 115A-115D that are provided to end users. In one embodiment, respective end users possessing respective access keys 115A-115D can access respective versions of the protected media content 103 at respective client devices. In another embodiment, respective end users possessing respective access keys 115A-115D can access respective versions of the protected media content 103 at a single client device (e.g., one of A 107, B 109, C 111 and D 113).

It should be appreciated that content source 101 can include such sources of scalable media content as media content servers, satellites, cameras, microphones, or media content storage devices. In the FIG. 1 embodiment, protected media content 103 is accessed by client devices 107, 109, 111, and 113 from content source 101. However, in other embodiments, protected media content 103 stored by a content storage device (e.g., CD, DVD, SmartMedia card, compact flash card, floppy, tape, hard disk, etc.) can be accessed directly from the content storage device by client devices A-D (e.g., 107, 109, 111 and 113).

In one embodiment, all versions of the protected media content 103 can be contained in and distributed by means of individual storage devices, e.g. compact flash, CD, or USB-gongle. Moreover, copies of the individual storage devices can be widely distributed, or only given to selected users (e.g., organizations, people etc.). In the present embodiment, any user who has access to the storage device can access the protected media content 103 up to the level to which that they have access given their access key (e.g., 115A-115D). In addition, a user can discard portions of the protected media content 103 that the user does not have access to or versions of the protected media content 103 that the user may have access to but are not interested in using (e.g., as a means of conserving storage space in storage devices).

Furthermore, in certain applications the device may automatically discard all protected content that the user does not have access to. For example, a storage device may initially include all levels of protected content for all the possible users. When the storage device is given to a specific user, based on the access provided by the user's access key, the device may retain all protected content that the user has been given access to, and discard the protected content that the user does not have access to. Discarding provides at least two benefits: (1) it can enhance security by eliminating content that the user does not have access to, and (2) it can improve usability by eliminating content which is not needed (and thereby increasing available storage space). It should be noted that discarding or eliminating protected content may involve various mechanisms such as multiple rewriting over the same physical space to eliminate any sign of the prior content, or simply changing entries in the file system (without rewriting on top of the original content). The preferred method of discarding or eliminating protected content depends on the specific application context.

In the present embodiment, a system for multiple level control of access privileges to protected media content 105 (e.g., or components thereof) can reside at the content source 101 at client devices 107, 109, 111 and 113, at intermediate locations or be distributed amongst these sites. It should be appreciated that the system for multiple level control of access privileges to protected media content 105 can include but is not limited to a profile data associating subsystem and an access key accessing subsystem (see description of the system for multiple level control of access privileges to protected media content made with reference to FIG. 5). In one embodiment, these subsystems can encompass components and operations of encoder and decoder devices that can be resident at the content source 101, at client devices 107, 109, 111 and 113 or at intermediate nodes. In other embodiments, these subsystems can be embodied by components and operations that are separate from but operate in cooperation with encoder and decoder components and operations.

Referring to FIG. 1, system for multiple level control of access privileges to protected media content 105 dictates which version or versions of the protected media content 103, that exists amongst multiple versions of the same or different protected media content 103, that an end user will be able to access. The level of access that the end user is granted determines the version(s) of the protected media content 103 that can be accessed by the access key (e.g., 115A-115D) that is provided to the end user.

It should be appreciated that the term "access key" (e.g., 115A-115D) corresponds to secret information that a user possesses which enables the user to gain access to the protected media content 103 (or a portion thereof). In the present embodiment, the access key (e.g., 115A-115D) can correspond to one or more keys, and can facilitate the generation of additional keys from an initial set of keys, which can be used for decryption, authentication, digital signatures, etc.

In one embodiment, the access key (e.g., 115A-115D) can provide access to protected media content 113 without user awareness of the level of access to the protected media content 103 that the user has been granted. In this embodiment, the user can use the access key (e.g., 115A-115D) to access protected media content 103 without knowing the level of access to which the protected media content 103 accessed corresponds.

Figure 4:
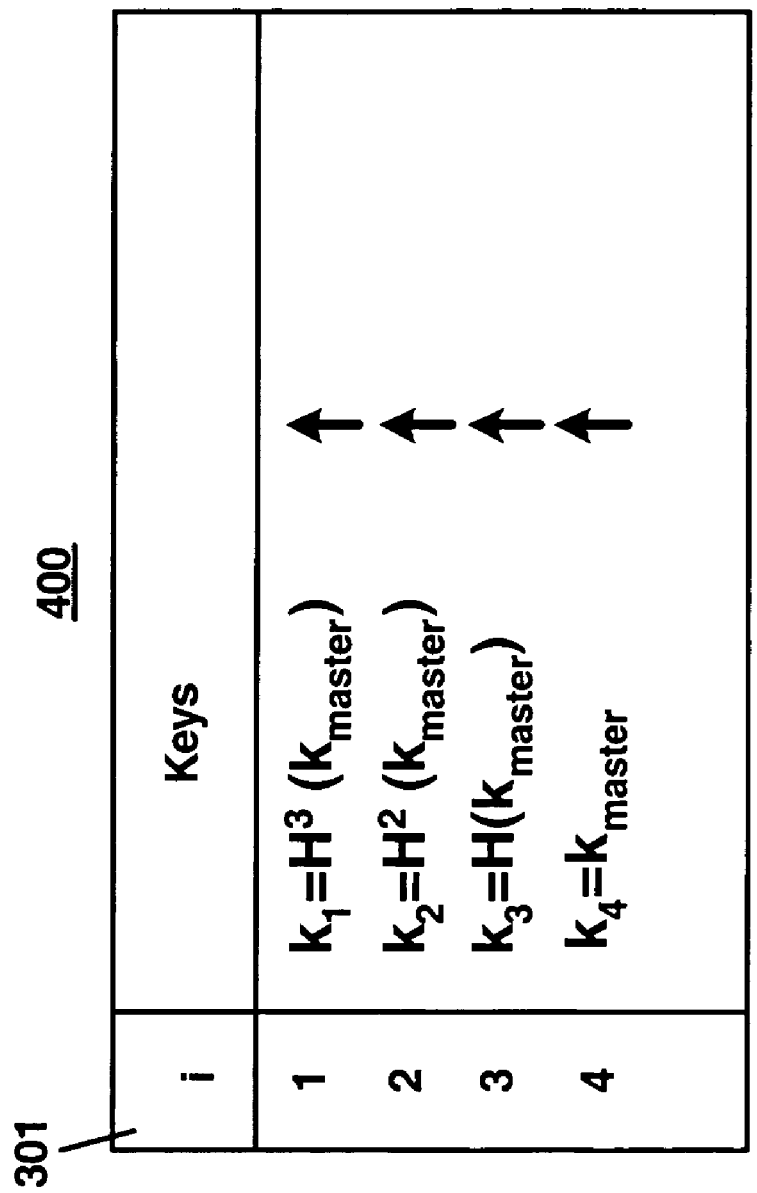
FIG. 4 illustrates an exemplary system of generating keys according to one embodiment of the present invention.

In the present embodiment, end users can either be denied access or allowed access to at least one version of the same protected media content (e.g., different qualities or spatial resolution layers for an image or video) based on the level of access that they have been granted (see discussion made with reference to FIG. 4).

In one embodiment, content source 101 can include signal processing devices such as encoders and encryptors (see discussion made with reference to FIG. 2 below) for encoding and encrypting media content. Likewise, client devices A-D 107, 109, 111 and 113 can include decoders and decryptors for decoding and decrypting the protected media content 103. The protected media content 103 can be accessed by the content source 101, for example, from images taken by a satellite of earthbound targets or from media content accessed from upstream sources of media content (not shown).

In the FIG. 1 example, content source 101 (e.g., a satellite) may be configured to capture images of specified earthbound targets (for example, high resolution images of a city). These images may then be converted into protected media content 103 that is transmitted to downstream nodes such as client devices A-D (e.g., 107, 109, 111 and 113) (it should be appreciated that in the present embodiment scaling can be performed either at client devices or at intermediate transcoders). In one embodiment, respective versions of the images, possessing respective scalable attributes, may be accessed at client devices 107, 109, 111 and 113 by end users who are granted respective levels of access to the protected media content 103 (for example access to various resolution images of the satellite image of the city). The access key (e.g., 115A-115D) that is held by the end user allows the end user to access the protected media content 103 version corresponding to the end user's access privileges (granted level of access to the protected media).

SCALABLE PROFILE DATA AND PROTECTION PROFILE DATA IN A SYSTEM FOR MULTIPLE LEVEL CONTROL OF ACCESS PRIVILEGES TO PROTECTED MEDIA ACCORDING TO ONE EMBODIMENT OF THE PRESENT INVENTION

Figure 2:
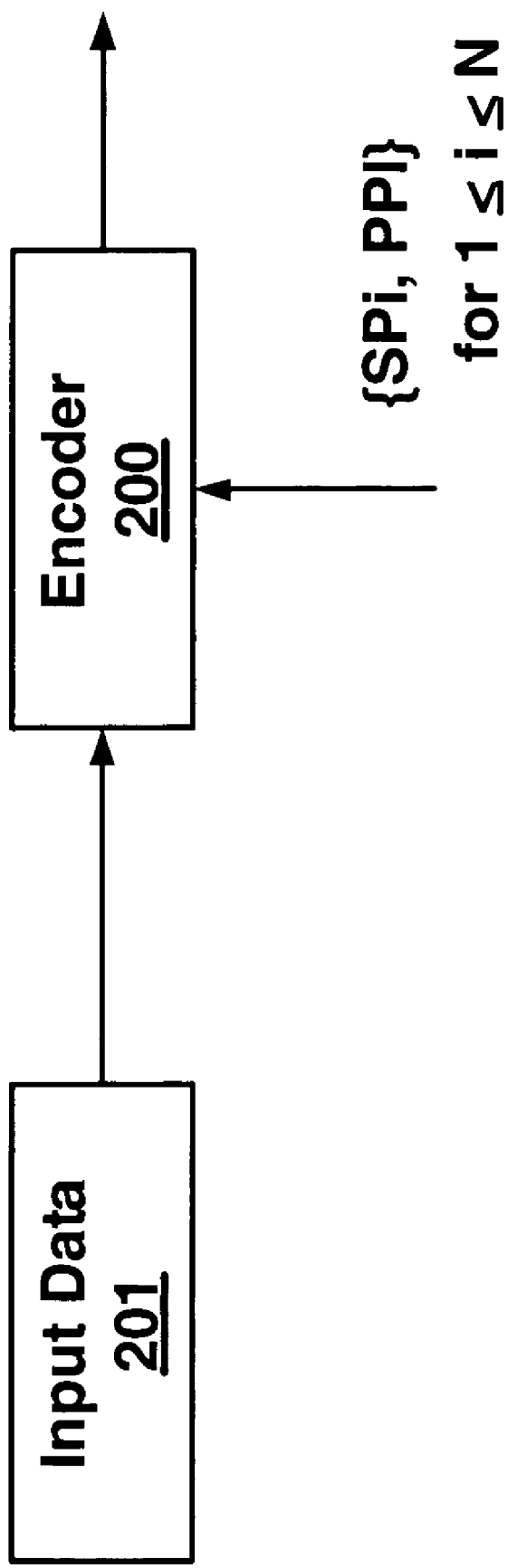
FIG. 2 shows an encoder such as may reside in the content source of FIG. 1 according to one embodiment of the present invention.

FIG. 2 shows an encoder 200 such as may reside in content source 101 of FIG. 1 according to one embodiment of the present invention. In the present embodiment, encoder 200 receives input data 201 (such as image data) accessed by the content source (e.g., 101 in FIG. 1); values of scalable attributes (or scalable profile data) (SPi); and values of protection attributes (or protection profile data) (PPi) that are associated with designated levels of end user access "i" (for $1 \leq i \leq N$) that encompass levels of end user access from lowest to highest. Encoder 200 outputs scalably encoded protected media content (e.g., 103 in FIG. 1) and scalable profile data SP and protection profile data PP that can be accessed by downstream client devices (e.g., 107-113 in FIG. 1). In one embodiment, the downstream client devices (e.g., 107-113 in FIG. 1) can include decoder systems that make authorized versions of protected content (e.g., 103 in FIG. 1) accessible to end users when provided a decryption key (e.g., 115A-115D in FIG. 1).

As alluded to above, encoder 200 can be configured to access information that details desired scalable profile data/scalable attribute ($SP_i$) to "level of access" designations and desired protection profile data/protection attribute ($PP_i$) to "level of access" designations (see FIG. 2). In one embodiment, such designations may be provided manually and/or by automation. The scalable profile data/scalable attribute (SPi), protection profile data/protection attribute (PPi), and designations, can be determined by access control requirements and client capabilities. For example, if it is known a priori that support is required for three different image resolutions, then the scalable profile data/scalable attributes can be designed to support the desired three different image resolutions.

In one embodiment, system for multiple level control of access privileges to protected media content (e.g., 105 in FIG. 1) or components thereof can encompass components and operations of encoder (e.g., 200) and decoder devices (not shown) that can be resident at the content source (e.g., 101 in FIG. 1) or at client devices (e.g., 107-113 in FIG. 1) (or intermediate devices) or be distributed there amongst. In other embodiments, system for multiple level control of access privileges to protected media content (e.g., 105 in FIG. 1) or components thereof can be embodied in components and operations that are separate from but operate in cooperation with encoder (e.g., 200) and decoder (not shown) components and operations. In the discussion that follows, scalable profile data and protection profile data, and the role that an encoder (e.g., 200) can play in generating such, according to one embodiment, are described in detail.

Exemplary Scalable Profile Data Generating System and Method

Scalable profile data consists of scalable attribute values cross referenced to segments of data. For purposes of the present application, a scalable attribute is defined as an attribute having a range of values that specifies how the encoded data are to be subsequently scaled. For image or video data, a scalable attribute can be, for example, bit rate, frame rate, resolution, color or black and white, region of interest, tile, quality, image objects, or foreground versus background.

Scalable attribute values are values specified for the scalable attributes. For example, scalable attribute values for bit rate can include full bit rate (B), one-half bit rate (B/2), one-fourth bit rate (B/4), and so on.

Scalable attributes and values can be similarly defined for other types of data (e.g., audio data, graphics data, and the like). For example, a scalable attribute value for audio data can indicate whether an audio track is stereo or mono, whether the sampling rate is high or low, whether the fidelity of the reconstructed audio is high or low, or whether the bit rate is 32 kb/s, 64 kb/s, or 128 kb/s. Electronic documents and text-based data may also be organized via scalable attributes that describe the content of the document or text-based data (e.g., chapters, sections, images, graphs, index, appendices, associated software, extra audiovisual material, etc.). It is beneficial to be able to adapt the selection of content, as well as the size of the content, to meet end-user preferences or device constraints such as available storage space. In addition, certain portions of these documents may be encrypted, either for confidentiality reasons or for commercial reasons (e.g., pay to read), while other portions of these documents may be in plain text (unencrypted).

In the present embodiment, encoder 200 encodes the input data using an encoding scheme such as an encoding scheme based on JPEG2000. As mentioned above, encoder 200 can provide other functionality. As a result of the encoding process, a bit stream, or a file containing such a bit stream, is generated. The file or bit stream is organized according to the encoding scheme; that is, the bits are in a certain order that is established by the encoding scheme. It should be appreciated that the output of encoder 200 includes what is referred to herein as scalable data, because the encoded data can be subsequently scaled by a transcoder or decoder.

Another output of encoder 200 includes what is referred to herein as scalable profile data. In essence, scalable profile data includes a cross-reference of scalable attribute values and corresponding data segments that constitute the scalable, encoded data. For example, the scalable profile data may be provided in the form of an index or lookup table that cross-references data segments and scalable attribute values, as is exemplified by Table 1 below.

TABLE 1

| Exemplary Scalable Profile Data (SP) | |
|---|---|
| Scalable Attribute | List of Data Segments (Bit Numbers) |
| Full Bit Rate (B) | 0-N |
| B/2 (R2, Q2) | 0-b1 and b2-b3 |
| B/2 (R1, Q3) | 0-b2 |
| B/4 | 0-b1 |

It should be appreciated that the format of Table 1 is exemplary only, and that the scalable profile data can be stored in any suitable computer-readable format. In Table 1, bits are identified by their bit numbers, but other addressing mechanisms may instead be used. Also, instead of identifying data segments by their bit range, other mechanisms can be used to identify such data segments. In general, the scalable profile data can include enough information to correlate or associate a value of a scalable attribute with one or more data segments in a bit stream.

It should be noted that, Table 1 only addresses bit rate (B), resolution (R) and quality (Q), but in actuality can include any scalable attributes and scalable attribute values selected by the user as input to encoder 200 (FIG. 3). In addition, the scalable profile data can include a variety of choices of data segments for each scalable attribute value. This can provide greater flexibility downstream at the transcoder or decoder. For example, in one application, a bit rate reduction of one-half can be achieved either at resolution level 2 (R2) and quality level 2 (Q2), or at resolution level 1 (R1) and quality level 3 (Q3). In this example, R1 may be better than R2, and Q2 may be better than Q3, so that the same bit rate can be achieved using either combination, but involving different tradeoffs in resolution and quality. Thus, by including multiple choices of data segments for each scalable attribute value in the scalable profile data, a user at a downstream node (e.g., at a transcoder or decoder) is better able to select the type and degree of scaling that suits his or her needs, for example.

In one embodiment, the scalable data and the scalable profile data can be stored together. For example, the scalable profile data can be appended to the bit stream or file that contains the scalable data. For instances in which there is a large quantity of scalable data, portions of the scalable profile data may be spaced at intervals within the bit stream or file.

Alternatively, the scalable profile data can be stored and handled separately from the scalable data. In one embodiment, it is not even necessary that the scalable profile data travel with the scalable data. For example, the scalable profile data can travel to a downstream device by a path that is different from the path traveled by the scalable data. Alternatively, the scalable profile data and the scalable data can be stored in separate locations, and then accessed and correlated at a downstream device.

In operation, the encoder 200 of FIG. 2 functions as follows. In one embodiment, values of scalable attributes are input by a user. Alternatively, values of scalable attributes may be automatically selected based on information known by encoder 200 about network performance, downstream device capabilities, and the like. Network performance characteristics such as available bandwidth may be monitored, and that information fed to encoder 200. Also, downstream devices (including the end-user device) may communicate directly with encoder 200.

Encoder 200 then encodes the input data in a conventional manner, using the encoding scheme it is employing (e.g., a JPEG2000 encoding scheme). In addition, the encoder 200 generates scalable profile data for the encoded bit stream (the scalable data). That is, in one embodiment, for each of the input values of scalable attributes, encoder 200 identifies corresponding data segments within the encoded data.

Importantly, according to the embodiments of the present invention, the scalable (encoded) data that is output by encoder 200 can be scaled without requiring knowledge of the encoding scheme employed by encoder 200. Whether the data are encoded using a JPEG2000 scheme or some other encoding scheme, a transcoder or decoder need only specify the type of scaling to be performed (e.g., reduce bit rate by one-fourth) to extract/parse from a bit stream the data segment(s) associated with that type of scaling.

In one embodiment, encoder 200 can identify several choices or combinations of data segments that correspond to a particular value of a scalable attribute. For example, to achieve a bit rate reduction of one-half (B/2), encoder 200 may identify several different combinations of data segments that are satisfactory. For image data, one combination may result in the reduced bit rate being applied to all portions of the image product. Another combination may result in full bit rate (B) being applied to a region of interest in the image product, and a bit rate reduced by a greater amount (e.g., B/4) being applied to other regions of the image product, such that the average bit rate is B/2.

At the encoding stage, encoder 200 can apply intelligence (either programmed intelligence or intelligence based on user input) to decide which combination or combinations of data segments to include in the scalable profile data. Alternatively, all combinations can be included; the transcoder or decoder can then decide which combination of data segments to use based on user input or other considerations such as network performance characteristics or end-user device capabilities.

Note that the data ultimately included by encoder 200 in the encoded bit stream or file can depend on the input values of the scalable attributes. For example, suppose that there is not a need for the scalable data to include data corresponding to the full bit rate case. Instead, only the cases of B/2 and B/4 are to be considered. Encoder 200 identifies data segments corresponding to B/2 and B/4, but these data segments do not encompass all of the encoded data. That is, there is some portion of the encoded data that is not indexed to B/2 or B/4 in the scalable profile data. If that portion of data is not associated with another scalable attribute, encoder 200 can decide to not include that data in the encoded bit stream or file.

In another embodiment, data segments associated with various values of scalable attributes may be defined ahead of time. In essence, the scalable profile data exemplified by Table 1 is established in advance of the data encoding. In this embodiment, the data are encoded and then organized in the bit stream in a manner that corresponds to the order defined by the scalable profile data. For example, the scalable profile data may define in advance that bits 0-b2 are reserved for bit rate reduction by one-half (B/2). Accordingly, encoder 32 will compress the data by the amount necessary to fit data associated with B/2 into bits 0-b2, and will place that data into those locations within the bit stream.

In yet another embodiment, an encoded file, organized according to an encoding scheme, is reorganized based on desired goals and on knowledge of the scalable attributes, and then, for example, stored or streamed. For instance, using scalable profile data (e.g., a cross-reference of data segment and scalable attribute) to locate relevant data segments in the encoded file, it may be useful to take an encoded file that is organized first by color component and second by resolution and reorganize the file so that it is instead ordered first by resolution and second by color component. By taking advantage of the scalable profile data, the reorganization can be achieved without requiring knowledge of the details of the encoding format.

Exemplary Protection Profile Data Generating System and Method

Protection profile data consists of protection attribute values cross referenced to segments of data. For purposes of the present application, a protection attribute is defined as an attribute having range parameters and associated values that specifies how the encoded data are to be protected. Protection attributes can include but are not limited to encryption primitives, encryption modes, cryptographic checksums (CCSs) or message authentication codes (MACs), integrity checks, digital signatures, and mapping of crypto to scalable media segments.

Protection attribute values are values specified for the protection attributes. For example, protection attribute values for encryption primitive can include Digital Encryption Standard (DES), 3-DES, Advanced Encryption Standard (AES), etc. Protection attributes and values can be similarly defined for other types of data (e.g., audio data, graphics data, and the like). For example, a protection attribute value for audio data can indicate whether an audio track is protected using message authentication code (MAC) or keyed-hashes as cryptographic checksums.

As previously discussed, encoder 200 encodes the input data using an encoding scheme such as an encoding scheme based on JPEG2000. As mentioned above, encoder 200 can provide other functionality. As a result of the encoding process, a bit stream, or a file containing such a bit stream, is generated. The output of encoder 200 includes what is referred to herein as scalable data, because the encoded data can be subsequently scaled by a transcoder or decoder.

Referring again to FIG. 2, another output of encoder 200 includes what is referred to herein as protection profile data. In essence, protection profile data includes a cross-reference of protection attribute values and corresponding data segments within the scalable data. For example, the protection profile data may be configured as an index or lookup table that cross-references data segments and protection attribute values, as exemplified in Table 2 below.

TABLE 2

Exemplary Protection Profile Data

| Protection Attribute/Value | List of Data Segments (Byte Numbers) |
| --- | --- |
| Encryption Primitive/AES | 0-N |
| Encryption Mode/CBC | 0-b1 and b2-b3 |
| MAC/HMAC with SHA-1 | 0-b2 |
| Mapping/Multiple Keying | 0-b1 |
| Digital Signature/DS | 0-N |

It is appreciated that the format of Table 2 is exemplary only, and that the protection profile data can be stored in any suitable computer-readable format. In Table 2, bytes are identified by their byte numbers, but other addressing mechanisms may be used. Also, instead of identifying data segments by their byte or bit or block (e.g. 8 byte) range, other mechanisms can be used to identify data segments. In general, the protection profile data includes enough information to relate a value of a protection attribute with one or more data segments.

It should be appreciated that Table 2 can include any protection attributes and protection attribute values selected by the user as an input to encoder 200 (FIG. 2). In addition, the list of data segments to which a particular protection attribute is to be applied can include multiple choices of data segments for each protection attribute value. This can provide a wide range of data protection flexibility at the encoder. Thus, the choice flexibility of exemplary embodiments, that allows the inclusion of multiple choices of data segments for each protection attribute value in the protection profile data, allows a user (e.g., providing input to the encoder) to select the type and degree of protection that suits his or her needs.

It should be noted that the scalable data (encoded and encrypted) that is output by encoder 200 can be scaled without requiring knowledge of the encoding scheme, or the encryption scheme employed by encoder 200. Whether the data are encoded using a JPEG2000 scheme or some other encoding scheme, a transcoder or decoder need only specify the type of scaling to be performed (e.g., reduce bit rate by one-fourth) to extract/parse from a bit stream the data segment(s) associated with that type of scaling.

In the embodiment of FIG. 2, the scalable data and the protection profile data are stored together. For example, the protection profile data can be appended to the bit stream or file that contains the scalable data. For instances in which there is a large quantity of scalable data, portions of the scalable profile data may be spaced at intervals within the bit stream or file.

Alternatively, the protection profile data can be stored and handled separately from the scalable data. In one embodiment, it is not even necessary that the scalable profile data travel with the scalable data. For example, the protection profile data can travel to a downstream device by a path that is different from the path traveled by the scalable data. Alternatively, the protection profile data and the scalable data can be stored in separate locations, and then accessed and correlated at a downstream device whenever necessary.

In operation, the encoder 200 functions as follows. In one embodiment, values of protection attributes are input by a user, which may include the content creator, content distributor, or content consumer. Alternatively, values of protection attributes may be automatically selected based on information known by encoder 200 about network performance, downstream device capabilities, digital right management (DRM) policies, security concerns or vulnerabilities, and the like. Network performance characteristics such as available bandwidth may be monitored, and that information fed to encoder 200. Also, downstream devices (including the end-user device) may communicate directly with encoder 200.

Encoder 200 then encodes the input data in a conventional manner, using the encoding scheme it is employing (e.g., a JPEG2000 encoding scheme). In addition, the encoder 200 generates protection profile data for the encoded bit stream (the scalable data). That is, in one embodiment, for each of the input values of protection attributes, encoder 200 identifies corresponding data segments within the encoded data to which the protection attribute may be associated.

In one embodiment, encoder 200 can identify several choices or combinations of data segments that are associated with a particular value of a protection attribute. For example, in the image product context, for a particular encryption primitive, encoder 200 may identify several different combinations of data segments that may be encrypted using that encryption primitive. According to one embodiment, one combination may result in the same encryption primitive being applied to all portions of the image product. Another combination may result in one encryption primitive being applied to one region of interest in the image product, and another encryption primitive being applied to other regions of interest in the image product.

At the encoding stage, encoder 200 can apply intelligence (either programmed intelligence or intelligence based on user input) to decide which combination or combinations of data segments to associate with the protection profile data. Alternatively, all combinations can be associated with protection profile data; the encoder can decide which combination (e.g., some or all) of data segments to associate with a particular protection attribute based on user input or other considerations such as network performance characteristics, end-user device capabilities, digital rights management policies (DRM), or security vulnerabilities.

In another embodiment, data segments associated with various values of protection attributes may be defined ahead of time. In essence, the protection profile data exemplified by Table 1 is established in advance of data encoding. In this embodiment, the data are encoded and then encrypted in a manner that corresponds to the manner defined by the protection profile data. For example, the protection profile data may define in advance that bytes 0-b2 are to be encrypted using an encryption primitive having protection attribute value AES. The encoder would then encrypt these bytes accordingly. It should be appreciated that both scalable profile data and protection profile data can be transmitted in either encrypted or unencrypted form and/or can be unhidden or hidden (e.g., obfuscated) from the user.

Table Mapping Scalable and Protection Attributes to Levels of Access

FIG. 3 shows a table 300 that illustrates an exemplary multiple level access control scheme according to one embodiment of the present invention. Mapping table 300 includes fields "i" 301 (corresponding to levels of access control 1-4), scalable profile 303, and protection profile 305 (including encryption 305A and key length 305B). Four levels of access control are illustrated; however, the present invention is not so limited. Mapping table 300 cross references the respective protection attribute values that are employed in the protection of respective versions of protected media content and the respective scalable attribute values of the protected media content to respective levels of access.

In the FIG. 3 example, image resolution is presented as a scalable attribute that differentiates the respective versions of protected media content. As discussed above, the mapping table cross references respective scalable attribute values (various levels of image resolution of the various versions of scalable media content) and respective protection attribute values to various levels of access control that may be granted to end users according to one embodiment of the present invention.

In the scheme illustrated in FIG. 3, four levels of access control "i" 301 are provided. The four levels of access control that are provided allow the accessing respectively of: (1) a low resolution image; (2) a medium resolution image; (3) a high resolution image; and (4) a highest resolution image.

It should be appreciated that the four levels of access detailed above can be granted to respective end users. For example, the low resolution image can be made accessible to anyone; the medium resolution image can be made accessible to clients for a premium; the high resolution image can be made accessible to certain organizations (e.g., police, firemen, etc.); and the a highest resolution image can be made accessible to a limited group of people (e.g., FBI, CIA etc.). The values shown in FIG. 3 as corresponding to resolution and key length are exemplary only and other values may be employed in exemplary embodiments.

Referring to FIG. 3, the scalable profile 303 describes the different scalable versions of the protected media content that are available. Moreover, the protection profile 305 describes the protection mechanism associated with each version of the content.

In the FIG. 3 example, the content source can be a satellite and the media content can be a high resolution satellite image of a city, for example, Washington, D.C. As mentioned above, according to one embodiment, respective clients can be allowed access to respective versions of the same protected media content (e.g., various resolutions of the satellite image of Washington, D.C.). It should be appreciated that if a version of the protected media content is not encrypted then a key is not needed for its access.

FIG. 4 illustrates an exemplary system 400 of generating keys according to one embodiment of the present invention. In the present embodiment, if there are N possible versions of media content, the respective N versions can be protected by N independent (unrelated) keys. In an alternate embodiment, the keys can be structured to relate in some manner. For example, the keys could be related via a hash chain, as is illustrated in FIG. 4. In the FIG. 4 example, one master key is used to generate N-1 additional keys by recursively applying a one-way hash function (e.g. SHA-1) such as is given by:

$$K_i = H^{N-i}(k_{master})$$

In the present embodiment, using the above noted one way hash function, k3, k2, and k1 can be computed given k4. Moreover, k2 and k1 can be computed given k3, and k1 can be computed given k2. Accordingly, lower numbered keys can be generated from higher numbered keys. However, higher numbered keys cannot be generated from lower numbered keys. As such, clients that possess a high level of access can decrypt content having a protection profile that corresponds to lower levels of access, but not vice versa. That is, clients who only possess lower levels of access cannot gain access to those versions of protected media content that correspond to higher levels of access. The above is one example embodiment of how a set of keys may be related in a structured manner, and how multiple keys can be generated given a single key (and knowledge of the relationship).

EXEMPLARY SYSTEM FOR MULTIPLE LEVEL CONTROL OF ACCESS PRIVILEGES TO PROTECTED MEDIA CONTENT ACCORDING TO ONE EMBODIMENT OF THE PRESENT INVENTION

Figure 5A:
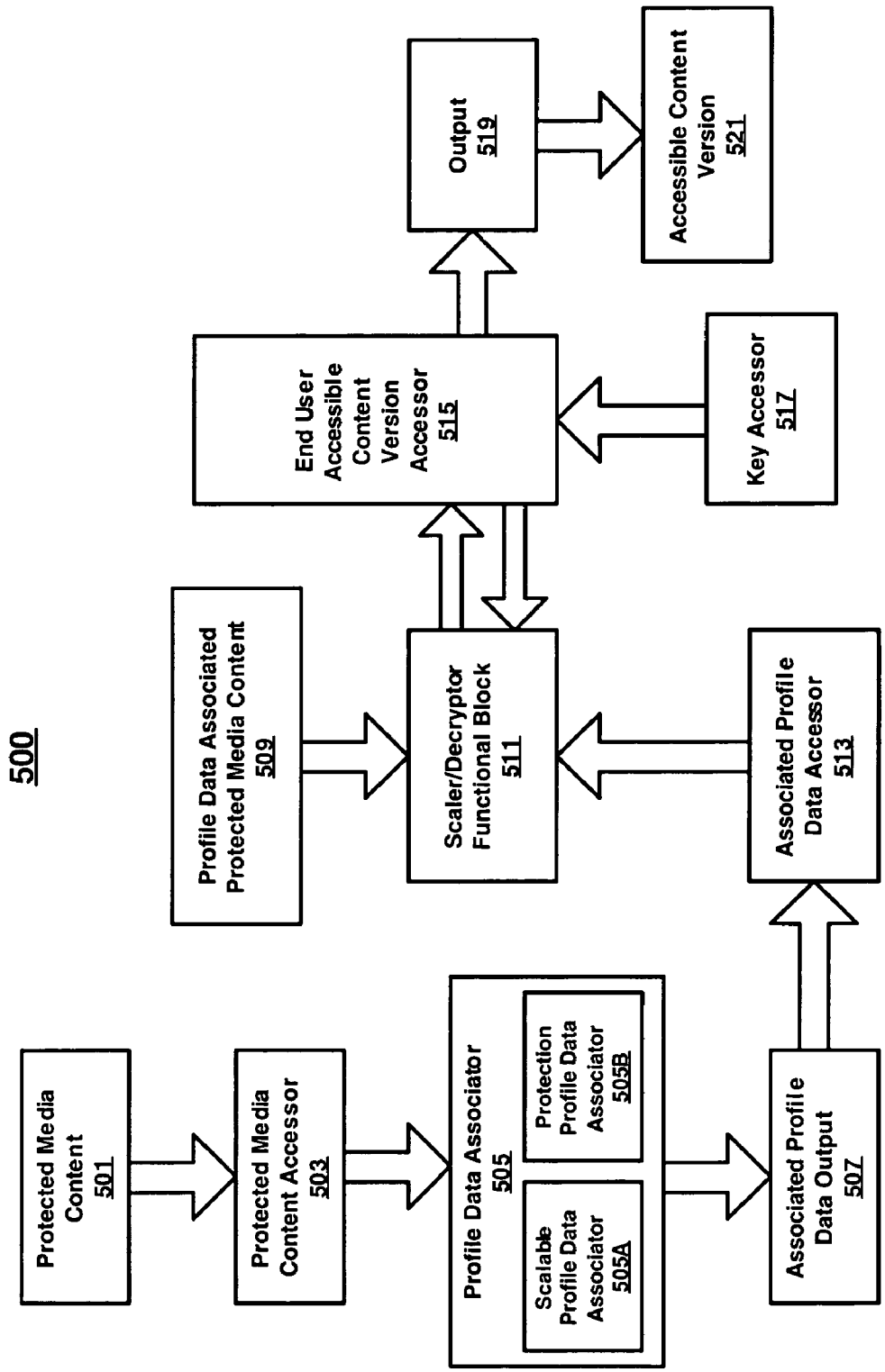
FIG. 5A shows a system for multiple level control of access privileges to protected media content according to one embodiment of the present invention.

FIG. 5A shows a system for multiple level control of access privileges to protected media content 500 (e.g., 105 in FIG. 1) according to one embodiment of the present invention. System for multiple level control of access privileges to protected media content 500 dictates which version or versions of protected media content 501, that exists amongst multiple versions of the same protected media content 501, that an end user will be able to access. The level of access that the end user possesses determines the version of the protected media content 501 that can be accessed by the access key (e.g., 115A-115D in FIG. 1) that is held by the end user.

In the present embodiment, end users can either be denied access or allowed access to at least one version of the same protected media content (e.g., different qualities or resolution layers) based on the level of access that they have been granted (see FIGS. 3 and 4 discussions above).

In one embodiment, system for multiple level control of access privileges to protected media content 500 or components thereof can encompass components and operations of encoder and decoder devices that can be resident at a content source (e.g., 101 in FIG. 1), at client devices (e.g., 107-113 in FIG. 1) (or intermediate devices) or be distributed there amongst. In other embodiments, system for multiple level control of access privileges to protected media content 500 or components thereof can be embodied in components and operations that are separate from but operate in cooperation with encoder and decoder components and operations.

FIG. 5A shows protected media content 501, protected media content accessor 503, profile data associator 505 (which includes scalable profile data associator 505A and protection profile data associator 505B), profile data output 507, profile data asociated protected media content 509 (e.g., 103 in FIG. 1), scaler/decryptor functional block 511, profile data accessor 513, end user accessible content accessor 515, access key accessor 517, output 519, and accessible content version 521.

In the FIG. 5A embodiment, protected media content 501 is accessed by protected media content accessor 503 from a source (or generator, etc.) of protected media content (e.g., 101 in FIG. 1). Profile data (e.g., scalable profile data and protection profile data) is associated with the protected media content 501 by profile data associator 505. The profile data that is associated with the protected media content includes both scalable profile data and protection profile data components (see $SP_1PP_1$-$SP_4PP_4$ in FIG. 5B).

Figure 5B:
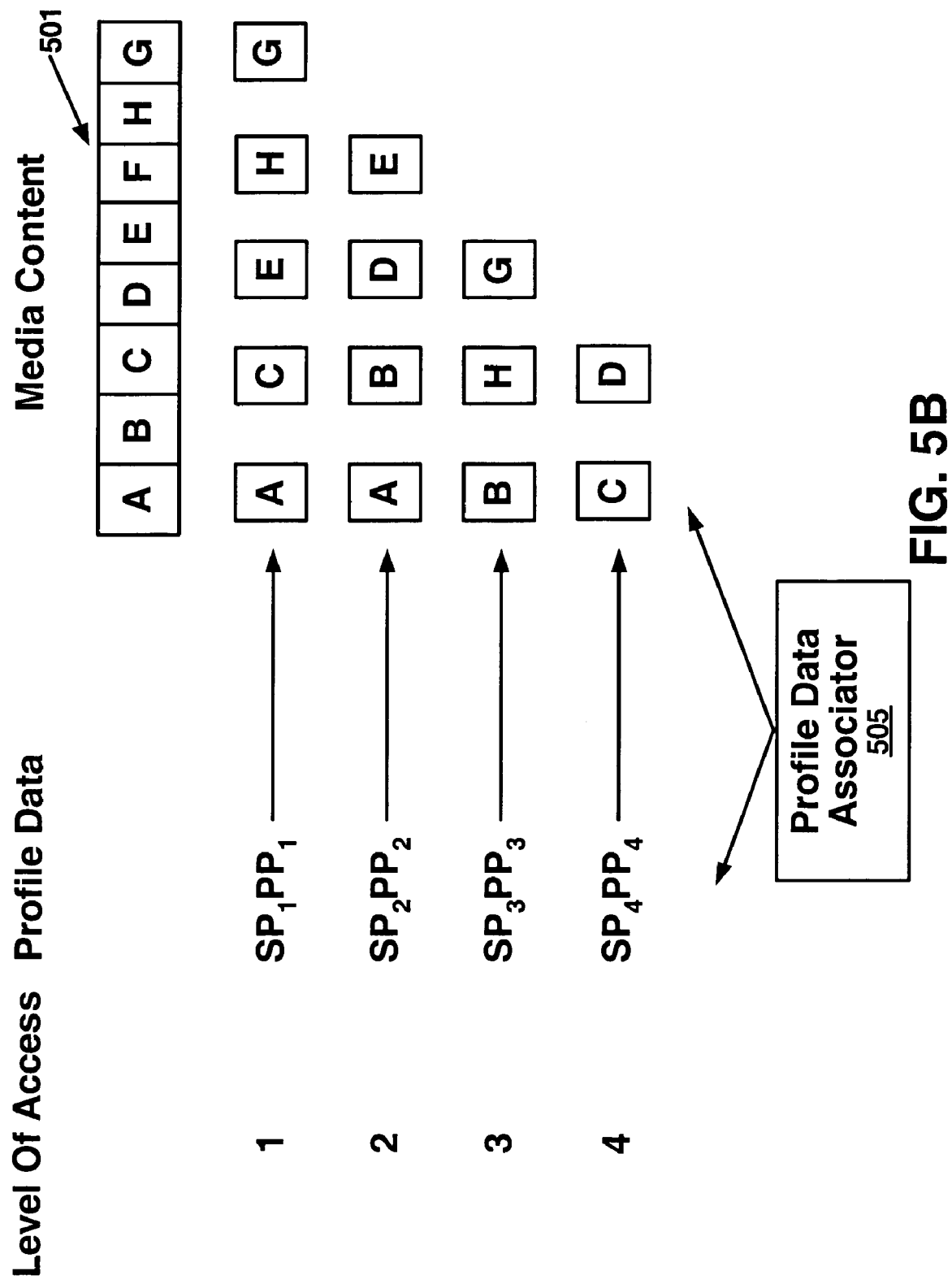
FIG. 5B shows components of a system for multiple level control of access privileges to protected media content according to one embodiment of the present invention.

As is shown in FIG. 5B, the profile data that is associated with the protected media content 501 by profile data associator 505 identifies respective combinations of the component parts (e.g., component parts A-G) of the protected media content 501 that can be combined to produce respective versions of the protected media content 501. In the FIG. 5B example, each of the respective versions correspond to a level of access (shown as 1-4 in FIG. 5B).

In one embodiment, protected media content 501 and it's component parts A-G, can undergo processing that modifies the protected content 501 and it's component parts A-G, by either adding data to or removing data from the protected media content 501 and it's component parts A-G. The processing that is done can include but is not limited to transcoding, compression and/or other signal modification/processing operations (e.g., averaging of protected content 501 or components thereof, sharpening of protected content or components thereof, etc.).

In one embodiment, protected media content accessor 503 can encompass components and operations associated with an encoder or can be embodied in components and operations that are separate from but operate in cooperation with encoder components and operations.

Referring again to FIG. 5A, scalable profile data associator 505A associates the scalable profile data component of the profile data with protected media content 501. The scalable profile data that is associated with the protected media content 501 identifies respective combinations of at least one portion of the protected media content 501 that can be combined in order to produce respective versions of the protected media content 501. It should be appreciated that a selection of the respective combinations that can be combined in order to produce respective versions of the protected media may be provided beforehand or may be based on information obtained from downstream sources (such as an end-user device).

Moreover, the respective versions of the protected media content 501 can possess respective scalable attributes (e.g., resolution, etc.). In one embodiment, values of scalable attributes are input by a user (content creator, content distributor, or content consumer). Alternatively, values of scalable attributes may be automatically selected based on information about network performance, downstream device capabilities, and the like. Additionally, network performance characteristics such as available bandwidth may be monitored.

It should be appreciated that scalable profile data associator 505A can encompass components and operations associated with an encoder or can be embodied in components and operations that are separate from but operate in cooperation with an encoder's components and operations. According to one embodiment, the functionality that is provided by the scalable profile data associator 503 can be either wholly or partially automated.

Protection profile data associator 505B associates the protection profile data component of the profile data with respective combinations of at least one portion of the protected media content 501. The protection profile data that is associated with the protected media content 501 identifies respective protection attributes of the encryption schemes that are used to encrypt respective versions of the protected media content 501. It should be appreciated that protection profile data associator 505B can encompass components and operations associated with an encoder or can be embodied in components and operations that are separate from but operate in cooperation with encoder components and operations.

In one embodiment, values of protection attributes can be input by a user, which may include the content creator, content distributor, or content consumer. Alternatively, values of protection attributes. may be automatically selected based on information known about network performance, downstream device capabilities, digital right management (DRM) policies, security concerns or vulnerabilities, and the like. In addition, network performance characteristics such as available bandwidth may be monitored and downstream devices (including the end-user device) may communicate information directly. In one embodiment, the functionality that is provided by the protection profile data associator 505B can be either wholly or partially automated.

Profile data accessor 513 accesses the profile data (that includes scalable profile data and protection profile data) that is associated by profile data associator 505 with protected media content 501 from profile data output 507, and supplies the profile data to scaler/decryptor functional block 511. It should be appreciated that profile data accessor 513 can encompass components and operations associated with a decoder or can be embodied in components and operations that are separate from but operate in cooperation with a decoder's components and operations.

In one embodiment, the scalable profile data and the protection profile data that is accessed by the profile data accessor 513 is supplied to a scaler/decryptor functional block 511 that generates the end user accessible version or versions of the protected media content 501 that corresponds to the access key (e.g., 115A-115D) provided by an end user.

In addition to the scalable profile data and the protection profile data, scaler/decryptor functional block 511 accesses profile data associated protected media content 509 and its associated profile data (including scalable profile data and protection profile data), and performs scaling and decryption operations on the profile data associated protected media content 509 based on the profile data. The profile data that is associated with the profile data associated protected media content 509 enables the scaler/decryptor functional block to scale and decrypt the profile data associated protected media content 509 so as to make accessible to end users the versions of the profile data associated protected media content 509 to which they are granted access. It should be appreciated that scaler/decryptor functional block 511 can encompass components and operations associated with a decoder or can be embodied in components and operations that are separate from but operate in cooperation with decoder components and operations.

In addition, scaler/decryptor functional block 511 can be configured to access an access key (e.g., 115A-115D in FIG. 1) that is supplied from an end user via means such as end user accessible content accessor 515. The access key (e.g., 115A-115D in FIG. 1) details the encryption scheme that encrypts the profile data associated protected media content 509 and facilitates the decryption, by the scaler/decryptor functional block 511, of the profile data associated protected media content 509.

It should be appreciated that scaling and decryption operations can be performed by separate functional entities. Moreover, scaling operations can be performed on data associated protected content 509, by an untrusted upstream device (not shown), such as a transcoder (using scalable profile data) before decryption is performed.

In the present embodiment, end user accessible content accessor 515 accesses an access key (e.g., 115A-115D in FIG. 1) that is supplied by an end user via access key accessor 517, and accesses the version or versions of the profile data associated protected media content 509 that corresponds to the accessed access key (e.g., 115A-115D in FIG. 1) (and that is made available from scaler/decryptor functional block 511). The accessible content version 521 that corresponds to the access key (e.g., 115A-115D in FIG. 1) is thereafter made available via output 519 to the end user that provides the access key (e.g., 115A-115D in FIG. 1).

As mentioned above, access key accessor 517 accesses an access key (e.g., 115A-115D of FIG. 1) from an end user that corresponds to a level of end user access that is granted to the end user. In one embodiment, the access key (e.g., 115A-115D of FIG. 1) can be accessed by access key accessor 517 from an end user that provides the access key (e.g., 115A-115D of FIG. 1) as part of an input request for accessible content to a computer (client device) resident system for multiple level control of end user access privileges to protected media content 500. In the present embodiment, the access key (e.g., 115A-115D of FIG. 1) can be provided via a conventional data inputting device (e.g., alphanumeric keyboard, mouse, keypad inputs, remote device, etc.). The access key (e.g., 115A-115D of FIG. 1) that is provided by the end user determines the version of the scalable media content that is accessible by the end user.

Output 519 accesses and outputs a version of profile data associated protected media content 509 that corresponds to an authorized level of end user access. In the present embodiment, output 519 can include but is not limited to such devices as desktop, palmtop, laptop and television displays.

Figure 6:
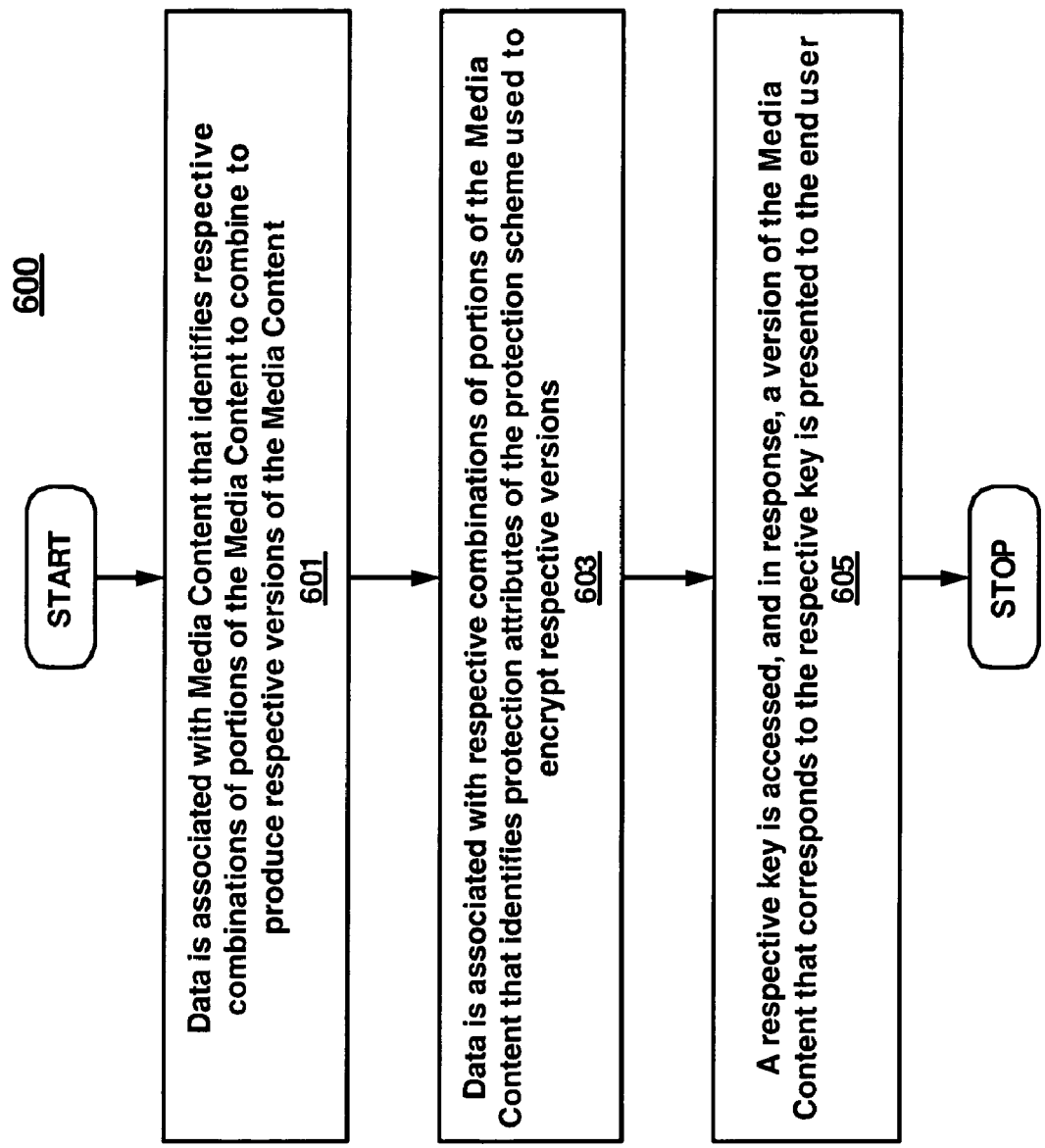
FIG. 6 shows a flowchart of a method for multiple level control of end user access privileges to protected media content according to one embodiment of the present invention.

FIG. 6 shows a flowchart 600 of the steps performed in a method for multiple level control of end user access privileges to protected media content according to one embodiment of the present invention. In one embodiment the steps of flowchart 600 are performed in association with components that are associated with a content source (e.g., 101 in FIG. 1) and a client device (e.g., 107, 109, 111 and 113 in FIG. 1) or devices that encompass functionality associated with both a content source (e.g., 101 in FIG. 1) and a client device (e.g., 107, 109, 111 and 113 in FIG. 1).

Referring to FIG. 6, at step 601, data is associated with accessed media content that identifies respective combinations of at least one portion of the media content to combine in order to produce respective versions of the media content that possess respective scalable attributes.

At step 603, data is associated with the respective combinations of at least one portion of the media content that identifies respective protection attributes of the encryption schemes used to encrypt the respective versions of the media content, wherein the respective protection attributes of the encryption schemes used to encrypt the respective versions of the media content correspond to respective keys that provide respective levels of access to the media content. And, at step 605, a respective key is accessed, and in response, a version of the media content that corresponds to the respective key is presented to the end user.

Figure 7:
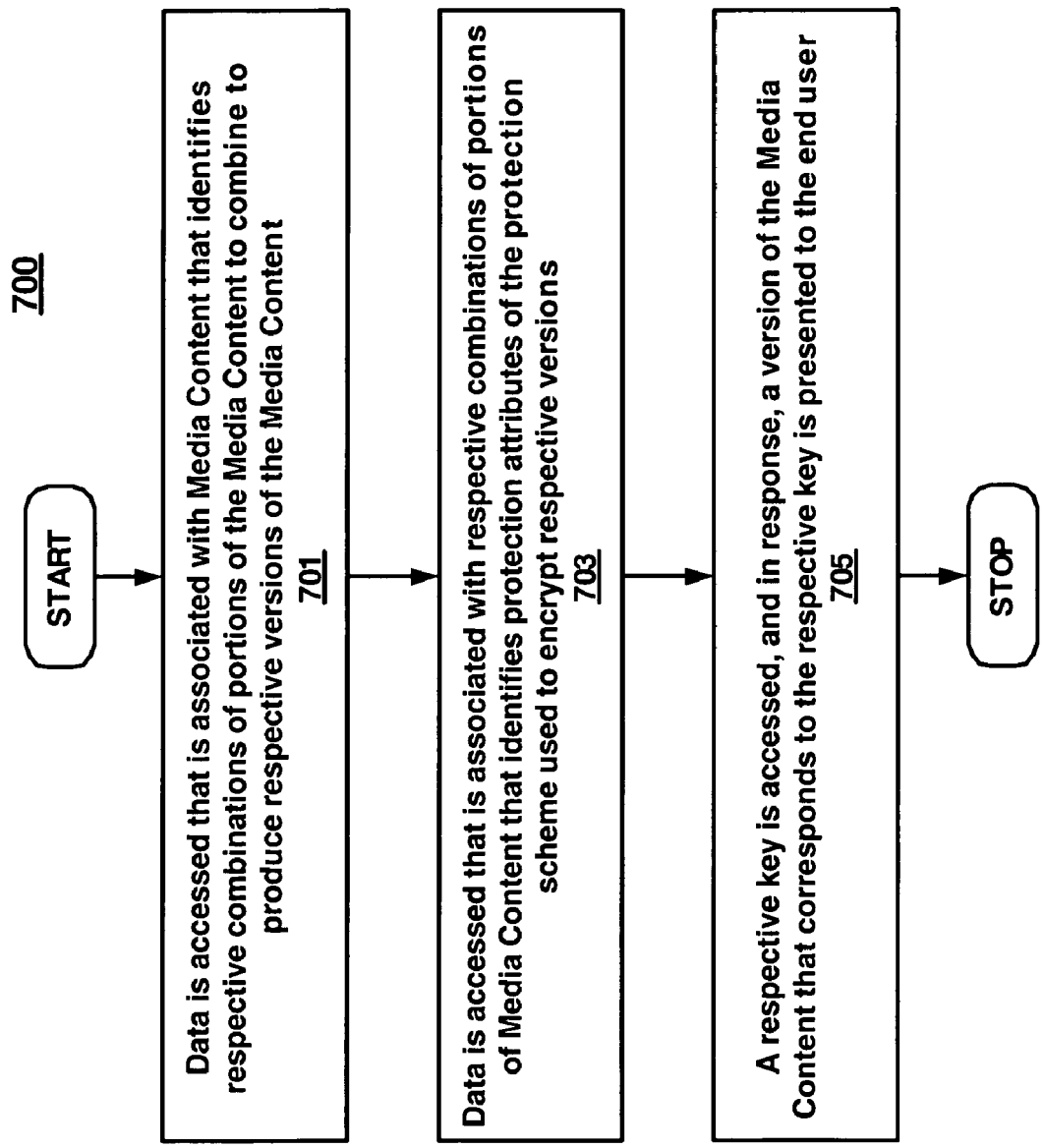
FIG. 7 shows a flowchart of a method for multiple level control of end user access privileges to protected media content according to one embodiment of the present invention.

FIG. 7 shows a flowchart 700 of the steps performed in a method for multiple level control of end user access privileges to protected media content according to one embodiment of the present invention. In one embodiment, the steps of flowchart 700 are performed in association with components that are associated with a client device (e.g., 107, 109, 111 and 113 in FIG. 1).

Referring to FIG. 7, at step 701, data is accessed that is associated with accessed media content that identifies respective combinations of at least one portion of the media content to combine in order to produce respective versions of the media content that possess respective scalable attributes.

At step 703, data is accessed that is associated with the respective combinations of at least one portion of the media content that identifies respective protection attributes of the encryption schemes used to encrypt the respective versions of the media content, wherein the respective protection attributes of the encryption schemes used to encrypt the respective versions of the media content correspond to respective keys that provide respective levels of access to the media content. And, at step 705, a respective key is accessed, and in response, a version of the media content that corresponds to the respective key is presented.

In summary, embodiments of the present invention have been explicitly described in which systems and methods for multiple level control of access privileges to protected media content are disclosed. Data is associated with accessed media content that identifies respective combinations of at least one portion of the media content to combine in order to produce respective versions of the media content that possess respective scalable attributes. In addition, data is associated with the respective combinations of at least one portion of the media content that identifies respective protection attributes of the encryption schemes used to encrypt the respective versions of the media content. Respective protection attributes of the encryption schemes used to encrypt the respective versions of the media content correspond to respective keys that provide respective levels of access to the media content. A respective key is accessed, and in response, a version of the media content is accessed that corresponds to the respective key.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for multiple level control of access privileges to protected media content, said method comprising:

associating first data with media content, said first data dictating scalability of different versions of said media content, wherein said different versions of said media content are produced using said first data, each of said different versions comprising one or more portions of said media content, said one or more portions selected using said first data, wherein said dictating scalability comprises:

encoding input data using an encoding scheme to generate encoded input data, said input data comprising values of scalable attributes; and generating scalable profile data for said encoded input data to produce generated scalable profile data, such that a corresponding data segment within said encoded input data is identified for each of said input data, and such that said generated scalable profile data can be scaled without requiring knowledge of said encoding scheme;

associating second data with said different versions, said second data identifying respective values of protection attributes used to encrypt said different versions, wherein said respective protection attributes correspond to respective keys that provide respective levels of access to said media content, wherein said identifying comprises generating a protection profile data, said protection profile data comprising a cross-reference of said protection attribute values and corresponding data segments, such that said protection profile data comprises enough information to relate a value of said values of protection attributes with one or more of said corresponding data segments; and transmitting said media content, said first data and said second data to a downstream device, wherein a key at said downstream device is used to access at least one different version of said media content corresponding to a level of access.

2. The method as recited in claim 1 wherein said method further comprises:
accessing a respective key, and in response, presenting a version of said media content that corresponds to said respective key.

3. The method as recited in claim 1 wherein said associating first data with media content comprises associating scalable profile data with said media content.

4. The method as recited in claim 1 wherein said associating second data with said different versions comprises associating protection profile data with said one or more portions of said media content.

5. The method as recited in claim 1 wherein said different versions possess respective scalable attributes that comprise resolution attributes.

6. The method as recited in claim 1 wherein said protection attributes comprise encryption type and key length.

7. The method as recited in claim 1 wherein said respective keys are generated from a master key by applying a one way hash function.

8. The method as recited in claim 1 wherein an end user with access to a version of content corresponding to one level of access can gain access to versions of content corresponding to lower levels of access.

9. The method as recited in claim 1 wherein all versions of said media content are contained in individual storage devices and end users that have access to said individual storage devices can access all versions of said media content contained thereon up to the level of access that corresponds to the key that they possess.

10. The method as recited in claim 1 wherein said respective key provides an end user access to said media content without said end user knowing the level of access to said media content that they possess.

11. The method as recited in claim 9 wherein versions of said media content that are not accessible by said end user are discarded either automatically or by said end user.

12. A method for multiple level control of access privileges to media content, said method comprising:
accessing first data that is associated with media content, said first data dictating scalability of different versions of said media content, wherein said different versions of said media content are produced using said first data, each of said different versions comprising one or more portions of said media content, said one or more portions selected using said first data, wherein said dictating scalability comprises:
encoding input data using an encoding scheme to generate encoded input data, said input data comprising values of scalable attributes; and
generating scalable profile data for said encoded input data to produce generated scalable profile data, such that a corresponding data segment within said encoded input data is identified for each of said input data, and such that said generated scalable profile data can be scaled without requiring knowledge of said encoding scheme;
accessing second data that is associated with said different versions, said second data identifying respective protection attributes used to encrypt said different versions, wherein said respective values of protection attributes correspond to respective keys that provide respective levels of access to said media content, wherein said identifying comprises generating a protection profile data, said protection profile data comprising a cross-reference of said protection attribute values and corresponding data segments, such that said protection profile data comprises enough information to relate a value of said values of protection attributes with one or more of said corresponding data segments;
transmitting said media content, said first data and said second data to a downstream device; and
accessing a respective key at said downstream device, and in response, presenting a version of said media content that corresponds to a level of access of said respective key.

13. The method as recited in claim 12 wherein said accessing said first data that is associated with media content comprises accessing scalable profile data that is associated with said media content.

14. The method as recited in claim 12 wherein said accessing said second data comprises accessing protection profile data that is associated with said one or more portions of said media content.

15. The method as recited in claim 12 wherein said different versions possess respective scalable attributes that comprise resolution attributes.

16. The method as recited in claim 12 wherein said protection attributes comprise encryption type and key length.

17. The method as recited in claim 12 wherein said respective keys are generated from a master key by applying a one way hash function.

18. The method as recited in claim 12 wherein an end user with access to a version of content corresponding to one level of access can gain access to versions of content corresponding to lower levels of access.

19. The method as recited in claim 12 wherein all versions of said media content are contained in individual storage devices and end users that have access to said individual storage devices can access all versions of said media content contained thereon up to the level of access that corresponds to the key that they possess.

20. The method as recited in claim 12 wherein said respective key provides and end user with access to said media content without said end user knowing the level of access to said media content that they possess.

21. The method as recited in claim 19 wherein versions of said media content that are not accessible by said end user are discarded either automatically or by said end user.

22. A computer useable device having computer useable code embodied therein for causing a computer to perform operations comprising:
correlating first data with media content, said first data dictating scalability of different versions of said media content, wherein said different versions of said media content are produced using said first data, each of said different versions comprising one or more portions of said media content, said one or more portions selected using said first data, wherein said dictating scalability comprises:
encoding input data using an encoding scheme to generate encoded input data, said input data comprising values of scalable attributes; and
generating scalable profile data for said encoded input data to produce generated scalable profile data, such that a corresponding data segment within said encoded input data is identified for each of said input data, and such that said generated scalable profile data can be scaled without requiring knowledge of said encoding scheme;
correlating second data with said different versions, said second data identifying respective protection attributes used to encrypt said different versions, wherein said respective values of protection attributes correspond to respective keys that provide respective levels of access to said media content, wherein said identifying comprises generating a protection profile data, said protection profile data comprising a cross-reference of said protection attribute values and corresponding data segments, such that said protection profile data comprises enough information to relate a value of said values of protection attributes with one or more of said corresponding data segments;

transmitting said media content, said first data and said second data to a downstream device; and receiving a respective key at said downstream device, and in response, presenting a version of said media content that corresponds to a level of access of said respective key.

23. The device as recited in claim 22 wherein said correlating said first data with media content comprises correlating scalable profile data with said media content.

24. The device as recited in claim 23 wherein said correlating second data with said different versions comprises correlating protection profile data with said one or more portions of said media content.

25. The device as recited in claim 23 wherein said different versions possess respective scalable attributes that comprise resolution attributes.

26. The device as recited in claim 22 wherein said protection attributes comprise encryption type and key length.

27. The device as recited in claim 22 wherein said respective keys are generated from a master key by applying a one way hash function.

28. The device as recited in claim 22 wherein an end user with access to a version of content corresponding to one level of access can gain access to versions of content corresponding to lower levels of access.

29. The device as recited in claim 22 wherein all versions of said media content are contained in individual storage devices and end users that have access to said individual storage devices can access all versions of said media content contained thereon up to the level of access that corresponds to the key that they possess.

30. The device as recited in claim 22 wherein said respective key provides an end user with access to said media content without said end user knowing the level of access to said media content that they possess.

31. The device as recited in claim 29 wherein versions of said media content that are not accessible by said end user are discarded either automatically or by said end user.

32. A system for multiple level control of access privileges to protected media content, said system comprising:

a data associator for associating first data with media content, said first data dictating scalability of different versions of said media content, wherein said different versions of said media content are produced using said first data, each of said versions comprising one or more portions of said media content, wherein said one or more portions are selected using said first data, wherein said dictating scalability comprises:

encoding input data using an encoding scheme to generate encoded input data, said input data comprising values of scalable attributes; and generating scalable profile data for said encoded input data to produce generated scalable profile data, such that a corresponding data segment within said encoded input data is identified for each of said input data, and such that said generated scalable profile data can be scaled without requiring knowledge of said encoding scheme;

a data associator for associating second data with said different versions, said second data identifying respective values of protection attributes used to encrypt said different versions, wherein said respective protection attributes correspond to respective keys that provide respective levels of access to said media content, wherein said identifying comprises generating a protection profile data, said protection profile data comprising a cross-reference of said protection attribute values and corresponding data segments, such that said protection profile data comprises enough information to relate a value of said values of protection attributes with one or more of said corresponding data segments; and a transmitter for transmitting said media content, said first data and said second data to a downstream device, wherein a key accessor at said downstream device is used to access at least one different version of said media content corresponding to a level of access that corresponds to said respective key.

33. The system as recited in claim 32 wherein said data associator for associating first data with media content associates scalable profile data with said media content.

34. The system as recited in claim 32 wherein said data associator for associating second data with said different versions associates protection profile data with said different versions.

35. The system as recited in claim 32 wherein said respective scalable attributes comprise resolution attributes.

36. The system as recited in claim 32 wherein said protection attributes comprise encryption type and key length.

37. The system as recited in claim 32 wherein said key accessor accesses respective keys that are generated from a master key by applying a one way hash function.

38. The system as recited in claim 32 further comprising an output wherein an end user with access to a version of content corresponding to one level of access can gain access to versions of content corresponding to lower levels of access.

39. The system as recited in claim 32 wherein all versions of said media content are contained in individual storage devices and end users that have access to said individual storage devices can access all versions of said media content contained thereon up to the level of access that corresponds to a key that they possess.

40. The system as recited in claim 32 wherein said respective key provides an end user with access to said media content without said end user knowing the level of access to said media content that they possess.

41. The system as recited in claim 39 wherein versions of said media content that are not accessible by said end user are discarded either automatically or by said end user.

* * * * *

UNITED STATES PATENT AND TRADEMARK OFFICE
CERTIFICATE OF CORRECTION

PATENT NO. : 7,958,369 B2  
APPLICATION NO. : 10/970912  
DATED : June 7, 2011  
INVENTOR(S) : John G. Apostolopoulos Page 1 of 1

It is certified that error appears in the above-identified patent and that said Letters Patent is hereby corrected as shown below:

On the face page, in field (54), Title, in column 1, line 2, after "ACCESS" delete "OF".

In column 1, line 2, after "ACCESS" delete "OF".

Signed and Sealed this  
Twenty-second Day of May, 2012

David J. Kappos  
*Director of the United States Patent and Trademark Office*